(12) United States Patent
Kanno

(10) Patent No.: US 7,823,910 B2
(45) Date of Patent: Nov. 2, 2010

(54) VIBRATION WELDING METHOD, VIBRATION WELDED STRUCTURE, AND AIRBAG APPARATUS

(75) Inventor: Yuki Kanno, Tokyo (JP)

(73) Assignee: Takata Corporation, Tokyo (JP)

( * ) Notice: Subject to any disclaimer, the term of this patent is extended or adjusted under 35 U.S.C. 154(b) by 150 days.

(21) Appl. No.: 12/100,628

(22) Filed: Apr. 10, 2008

(65) Prior Publication Data

US 2008/0258439 A1    Oct. 23, 2008

(30) Foreign Application Priority Data

Apr. 20, 2007  (JP)  .............. 2007-111921

(51) Int. Cl.
*B60R 21/20*  (2006.01)
(52) U.S. Cl. .................................. 280/728.3
(58) Field of Classification Search ............. 280/730.2, 280/728.3, 728.2; 264/248; *B60R 21/16, B60R 21/20*
See application file for complete search history.

(56) References Cited

U.S. PATENT DOCUMENTS

2002/0014759 A1*  2/2002  Desprez ................... 280/728.3
2005/0127642 A1*  6/2005  Weissert et al. .......... 280/728.3

FOREIGN PATENT DOCUMENTS

| JP | 2004 276797 | 10/2004 |
| JP | 2006 181999 | 7/2006 |
| JP | 2007 7968 | 1/2007 |

* cited by examiner

*Primary Examiner*—Paul N Dickson
*Assistant Examiner*—Robert A Coker
(74) *Attorney, Agent, or Firm*—Fitch, Even, Tabin & Flannery

(57) ABSTRACT

A vibration welding method, a vibration-welded structure, and an airbag apparatus capable of reducing the positional deviation of junction between workpieces different in the die releasing direction are provided. An airbag apparatus according to one form of the present invention includes an airbag that is normally folded and is inflated and developed at an emergency; an inflator for supplying gas to the airbag; a retainer for accommodating the airbag and the inflator therein; an outer panel mounted on an instrument panel; and an inner case vibration-welded to the inside of the outer panel for retaining the retainer, in which when a die releasing direction of the outer panel differs from a die releasing direction of the inner case, a positioning plane of the inner case is molded to agree with the die releasing direction of the outer panel while the outer panel is provided with a positioning rib formed thereon.

8 Claims, 9 Drawing Sheets

(A)

INNER CASE, DIE RELEASING DIRECTION Q | OUTER PANNEL, DIE RELEASING DIRECTION P (B)

OUTER PANNEL, DIE RELEASING DIRECTION P | INNER CASE, DIE RELEASING DIRECTION Q (A)

VIBRATION WELDING METHOD, VIBRATION WELDED STRUCTURE, AND AIRBAG APPARATUS

FIELD OF THE INVENTION

The present invention relates to a vibration welding method for welding workpieces together by applying vibration to the pressurized junction in a predetermined direction, a vibration welded structure, and an airbag apparatus, and more specifically, it relates to a vibration welding method suitable for a case where the die releasing direction is different in both the workpieces during molding, a vibration welded structure, and an airbag apparatus.

BACKGROUND OF THE INVENTION

With the improvement in functions of a resin itself and in molding technique as background, resin molded products have been recently used in various fields for responding to the demand for the reduction in weight and cost. The field of automobile industries is not exceptional so that the resin molded products have been used for engine components, airbag apparatus components, interior and exterior components (an instrument panel, a duct, a door trim, a glove box, a center console, and a bumper). With increasing number of components of the resin molded product, cases where two resin-molded products are joined together have also been increased. In the case of a thermoplastic resin-molded product, a deposition technique by heating a resin molded product is generally adopted. Its heat source may include a heater, frictional heat, induction heat, laser heat, and radiation heat; whereas, in the field of automobile industries, the vibration welding using the frictional heat has been widely used (see Japanese Unexamined Patent Application Publication No. 2004-276797, for example).

The vibration welding is a method for welding workpieces together by placing one workpiece on another so that vibration is applied to the pressurized workpieces in a predetermined direction so as to generate frictional heat. The invention described in Japanese Unexamined Patent Application Publication No. 2004-276797 relates to a device for mounting an airbag apparatus in that when an instrument panel (welding workpiece) and an airbag-mounting gadget (workpiece to be welded) are welded together, even if the junction position is deviated, the deviation can be easily recognized to be allowable for normally developing of the airbag.

However, the object of the invention described in Japanese Unexamined Patent Application Publication No. 2004-276797, on the assumption that the junction position between workpieces is deviated, is to determine whether the deviation is within the allowable range, so that the invention is not for reducing the deviation itself of the junction position.

The reasons for the deviation in junction position during the vibration welding include an excitation force during vibration and the positional displacement already made at the step of placing one workpiece on the other. In order to reduce the deviation, generally, a positioning rib may be raised from a workpiece to be welded; a positioning jig may be used; or while a positioning pin is raised from a workpiece to be welded, a hole may be formed through the junction of the workpieces for inserting the pin. When the die releasing direction is the same during the molding of the workpieces, the positioning rib or jig can be precisely abutted to the outer peripheral junction face of the workpieces, or the positioning pin can also be inserted into the workpiece hole precisely.

However, the die releasing direction is not always the same during the molding of the workpieces. FIG. 9 herein includes arrangement drawings of an outer panel and an inner case of a conventional airbag apparatus, in which FIG. 9(A) shows a case having a positioning rib; FIG. 9(B) shows a case having a positioning pin; and FIG. 9(C) shows a case where the junction position is deviated.

An outer panel 91 shown in FIG. 9 is a panel with a surface (surface opposite to the attaching surface of an inner case 92) forming part of an instrument panel. After the inner case 92 is welded to the outer panel 91 as shown in the drawing, other components of the airbag apparatus are mounted by conversion and the outer panel 91 is fixed on the instrument panel with the surface facing a cabin and the surface attaching the inner case 92 facing a vehicle body. The outer panel 91 shown in FIG. 9(A) is provided with positioning ribs 91a and 91b raised therefrom, and the outer panel 91 shown in FIG. 9(B) is provided with positioning pins 91c and 91c raised therefrom.

The inner case 92 is a component, called an airbag attaching gadget or bracket, for supporting a retainer accommodating an airbag therein or for gate-opening the outer panel 91 during the inflating and developing the airbag. The inner case 92 includes an inner panel 92a, and the inner panel 92a and the outer panel 91 are vibration-welded together. Also, the inner panel 92a shown in FIG. 9(B) is provided with holes 92b formed to be inserted by positioning pins 91c, respectively.

When the outer panel 91 is fixed to an inclined instrument panel, the die releasing direction may be different during the molding the inner case 92 (the welding workpiece) and the outer panel 91 (the workpiece to be welded). For example, as shown in FIG. 9, the die releasing direction P of the outer panel 91 may be roughly vertical while the die releasing direction Q of the inner case 92 may be roughly vertical to the inclined surface of the outer panel 91. The angle between the die releasing directions P and Q is assumed to be α.

At this time, in the conventional example shown in FIG. 9(A), the outer peripheral face of the inner panel 92a is not in parallel with the rib 91b, so that a clearance of an angle α is produced. Also, in the conventional example shown in FIG. 9(B), the plane, on which the hole 92b of the inner panel 92a is formed, is not in parallel with the pin 91c, so that a clearance of an angle α is produced. Recently, the inclination of the instrument panel has had a tendency to increase in design approach, so that the clearance of the angle α is also liable to increase.

When a clearance is produced between the outer peripheral face of the inner panel 92a and the rib 91b in such a manner, problems arise in that the inner panel 92a runs on the rib 91b as shown in FIG. 9(C) when the inner case 92 is placed on the outer panel 91 or during the vibration welding as well as skilled workers are needed for operation, resulting in the deterioration in yield. Such problems are not limited to the example of the airbag apparatus described above, so that they are common to cases where workpieces different in die releasing direction are welded together.

SUMMARY OF THE INVENTION

The present invention has been made in view of the problems described above, and it is an object thereof to provide a vibration welding method, a vibration-welded structure, and an airbag apparatus capable of reducing the positional deviation of junction between workpieces different in the die releasing direction.

According to the present invention, in a vibration welding method for welding workpieces together by applying vibration to the junction between the pressurized workpieces, of which die releasing directions differing from each other, in a predetermined direction, the vibration welding method is provided that includes the steps of molding the welding workpiece so that positioning planes formed on the circumferential plane of the junction of the welding workpiece roughly in parallel with the vibration direction agree with the die releasing direction of the workpiece to be welded; molding the workpiece to be welded having a plurality of projections molded at positions facing the positioning planes of the workpiece to be welded; and vibration welding the workpieces together by placing the welding workpiece onto the workpiece to be welded so that the positioning plane faces the projection. Preferably, the positioning planes are formed on both sides of the junction of the welding workpiece, or in a notch formed in the junction of the welding workpiece, or in an opening formed in the junction of the welding workpiece. Also, the notch may be formed at substantially the center of each of both-end parts, which are roughly perpendicular to the vibration direction, of the junction of the welding workpiece. The step of molding the welding workpiece may also include molding the welding workpiece using a die configured to have a parting line formed along outermost edges of the positioning planes in a direction perpendicular to the vibrating direction.

According to the present invention, in a vibration welded structure configured of workpieces welded together by applying vibration to the junction between the pressurized workpieces, of which die releasing directions differing from each other, in a predetermined direction, the vibration welded structure is provided that includes the welding workpiece including positioning planes that are formed on the circumferential plane of the junction of the welding workpiece roughly in parallel with the vibration direction so as to agree with the die releasing direction of the workpiece to be welded; and the workpiece to be welded having a plurality of projections molded at positions facing the positioning planes. Preferably, the positioning planes are formed on both sides of the junction of the welding workpiece, or in a notch formed in the junction of the welding workpiece, or in an opening formed in the junction of the welding workpiece. The notch may also be formed at substantially the center of each of both-end parts, which are roughly perpendicular to the vibration direction, of the junction of the welding workpiece. In addition, the welding workpiece may be an inner case of an airbag and the workpiece to be welded may be an outer panel constituting an instrument panel of a vehicle.

According to the present invention, an airbag apparatus is provided that includes an airbag that is normally folded and is inflated and developed at an emergency; an inflator for supplying gas to the airbag; a retainer for accommodating at least the airbag therein; an outer panel for covering an opening formed on a vehicle structure for releasing the airbag therethrough; and an inner case connected to the inside of the outer panel for retaining the retainer, in which die releasing directions of the outer panel and the inner case during molding differ from each other, and the outer panel and the inner case are joined together by vibration welding, in which the inner case includes an inner panel to be welded to the outer panel and a side wall forming a space accommodating the retainer therein, and in which the inner panel is provided with positioning planes formed on the circumferential plane of the junction roughly in parallel with the vibration direction agree with the die releasing direction of the outer panel while the outer panel is provided with a plurality of projections formed at positions facing the positioning planes. Preferably, the positioning planes are formed on both sides of the inner panel, or in a notch formed in the inner panel, or in an opening formed in the inner panel. Also, the notch may also be formed at substantially the center of each of both-end parts, which are roughly perpendicular to the vibration direction, of the junction of the inner case.

According to the vibration welding method, the vibration welded structure, and the airbag apparatus of the present invention described above, the welding workpiece is molded so that the positioning planes formed on the circumferential plane of the junction of the welding workpiece roughly in parallel with the vibration direction agree with the die releasing direction of the workpiece to be welded. Thereby, even when the die releasing direction of the welding workpiece is different from that of the workpiece to be welded, the clearance between the positioning plane and the projection of the workpiece to be welded can be set smaller so that the junction of the welding workpiece cannot run on the workpiece to be welded, reducing the deviation in junction position between the welding workpiece and the workpiece to be welded. As a result, the product yield can be improved and the operation is enabled to be easily done by any people without a skilled worker.

By forming the positioning planes on both sides of the junction of the welding workpiece, or in the notch or in the opening, the positioning of the welding workpiece can be effectively done without disturbing the vibration welding. Furthermore, by forming the notch at substantially the center of each of both-end parts, which are roughly perpendicular to the vibration direction, of the junction of the welding workpiece, the number of projections of the workpiece to be welded necessary for the positioning of the welding workpiece can be reduced so as to reduce cost.

In the step of molding the welding workpiece of the vibration welding method according to the present invention, by using a die configured to have a parting line formed along outermost edges of the positioning planes in a direction perpendicular to the vibrating direction, the welding workpiece can be easily molded, which includes positioning planes formed on the circumferential plane of the junction of the welding workpiece in parallel with the vibration direction so as to agree with the die releasing direction of the workpiece to be welded.

BRIEF DESCRIPTION OF THE DRAWINGS

FIG. 1 includes sectional views showing an airbag apparatus according to the present invention, in which FIG. 1(A) shows a first embodiment and FIG. 1(B) shows a second embodiment.

FIG. 2 includes drawings showing a vibration-welded structure of the airbag apparatus according to the first embodiment, in which FIG. 2(A) is a plan view and FIG. 2(B) is a sectional drawing viewed in arrows B-B direction of FIG. 2(A).

FIG. 3 includes drawings showing an inner case fabricating process, in which FIG. 3(A) shows a product molding process; FIG. 3(B) a die releasing process; and FIG. 3(C) a product taking out process.

FIG. 4 includes drawings showing an outer panel fabricating process, in which FIG. 4(A) shows a product molding process; FIG. 4(B) a die releasing process; and FIG. 4(C) a product taking out process.

FIG. 5 includes drawings showing a vibration welding process, in which FIG. 5(A) shows a placing process; FIG. 5(B) a pressurizing process; and FIG. 5(C) a vibrating process.

FIG. 6 includes drawings showing a vibration welded structure according to a second embodiment, in which FIG. 6(A) is a plan view and FIG. 6(B) is a sectional drawing viewed in arrows B-B direction of FIG. 6(A).

FIG. 7 includes drawings showing a vibration welded structure according to a third embodiment, in which FIG. 7(A) is a plan view and FIG. 7(B) is a sectional drawing viewed in arrows B-B direction of FIG. 7(A).

FIG. 8 includes drawings showing a vibration welded structure according to a fourth embodiment, in which FIG. 8(A) is a plan view and FIG. 8(B) is a sectional drawing viewed in arrows B-B direction of FIG. 8(A).

FIG. 9 includes arrangement drawings of an outer panel and an inner case of a conventional airbag apparatus, in which FIG. 9(A) shows a case having a positioning rib; FIG. 9(B) shows a case having a positioning pin; and FIG. 9(C) shows a case where the junction position is deviated.

DETAILED DESCRIPTION OF THE PREFERRED EMBODIMENTS

Figure 1:
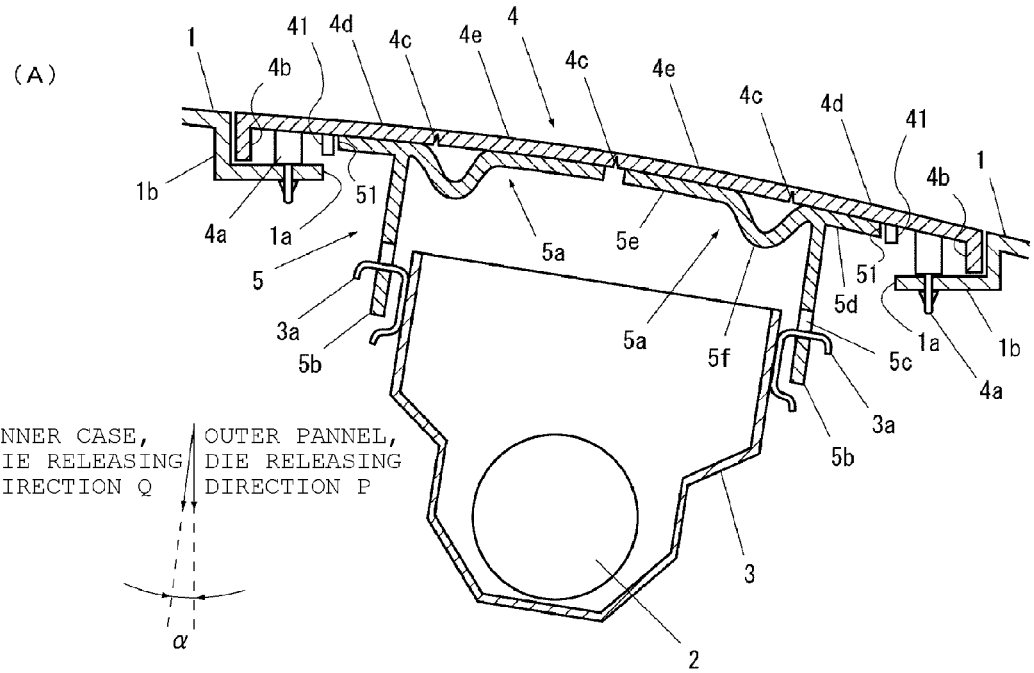
Figure 1:
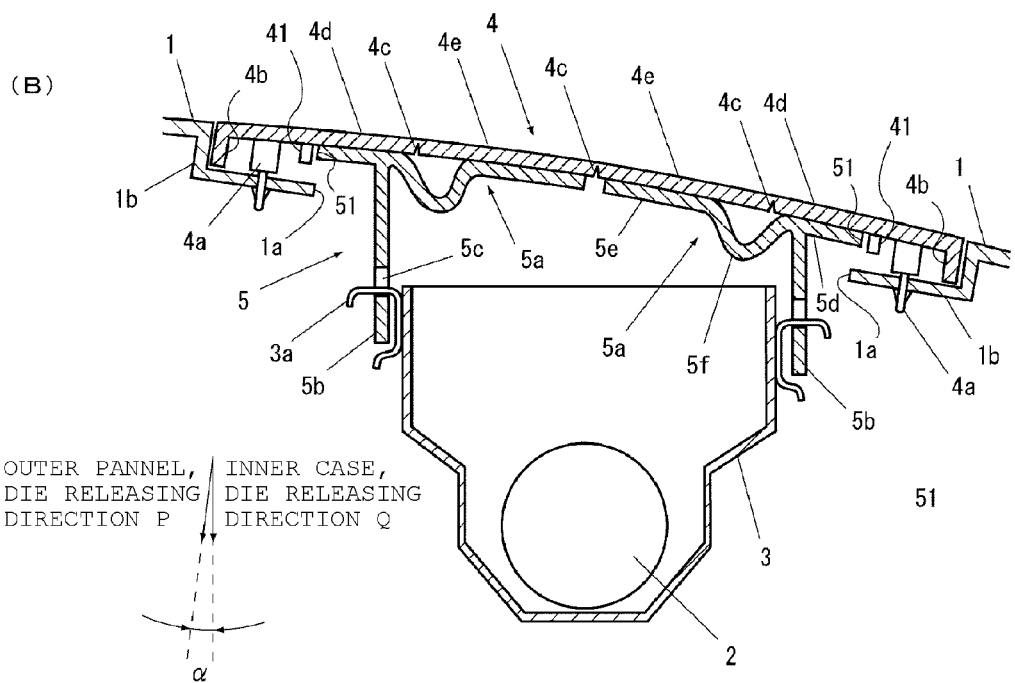
Figure 2:
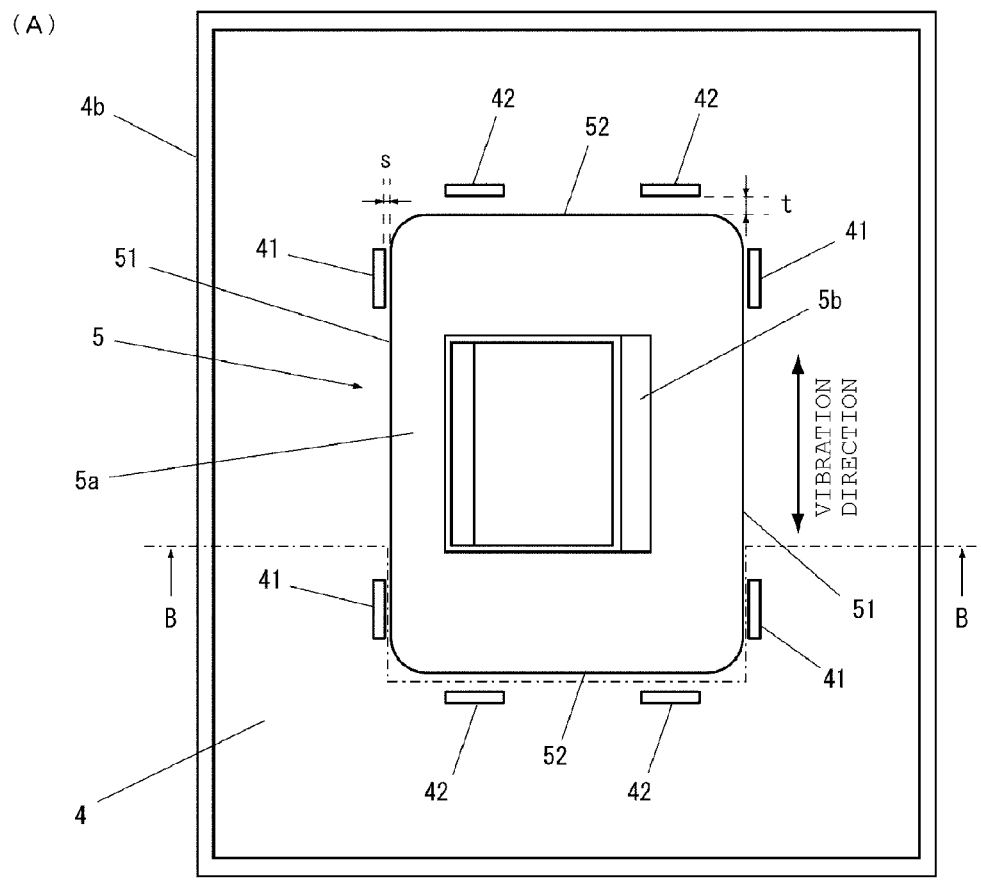
Figure 2:
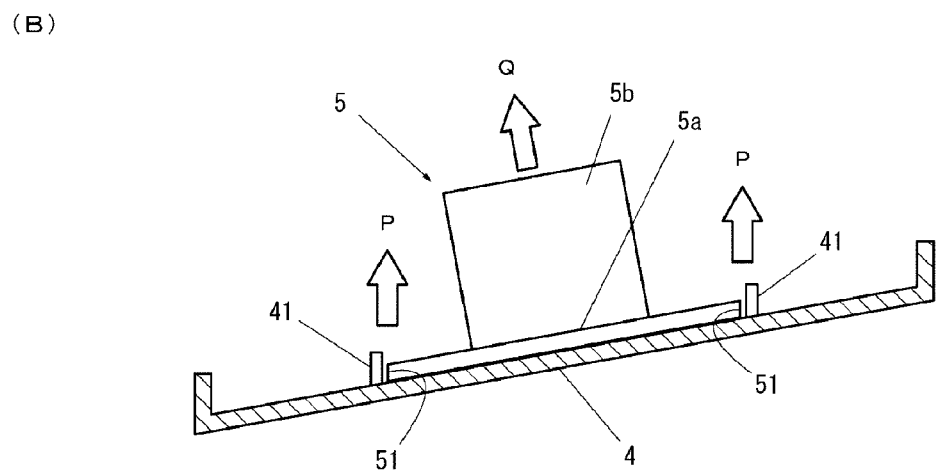

Embodiments of the present invention will be described below with reference to FIGS. 1 to 8. FIG. 1 herein includes sectional views showing an airbag apparatus according to the present invention, in which FIG. 1(A) shows a first embodiment and FIG. 1(B) shows a second embodiment. FIG. 2 includes drawings showing a vibration-welded structure of the airbag apparatus according to the first embodiment, in which FIG. 2(A) is a plan view and FIG. 2(B) is a sectional drawing viewed in arrows B-B direction of FIG. 2(A).

The airbag apparatus shown in FIGS. 1(A) and 1(B) is a passenger airbag apparatus according to the embodiment of the present invention, which is housed adjacent to a vehicle body in an instrument panel 1 that is arranged in front of a passenger seat. Such an airbag apparatus includes an airbag (not shown) that is generally folded, and is to be inflated and developed at an emergency, an inflator 2 for supplying gas to the airbag, a retainer for accommodating the airbag and the inflator 2 therein, an outer panel 4 mounted on the instrument panel 1, and an inner case 5 to be vibration-welded inside the outer panel 4 for retaining the retainer 3. As examples in that the die releasing direction is different during the molding of the outer panel 4 and the inner case 5, the first embodiment is shown in FIG. 1(A) and the second embodiment is shown in FIG. 1(B). In addition, the inflator 2 may not be accommodated within the retainer 3 but it may also be externally attached to the retainer 3.

The instrument panel 1 is inclined so that the front side in the vehicle front-back direction is higher while the rear side is lower, and at an intermediate portion in the vehicle front-back direction, an opening 1a is formed in a substantially rectangular shape for releasing the airbag. On the periphery of the opening 1a, a recess 1b is formed for mounting an outer panel 4, and the recess 1b is provided with a plurality of holes to be inserted by a plurality of grips 4a arranged in the outer panel 4, respectively. According to the first embodiment shown in FIG. 1(A), the recess 1b is substantially vertically directed, whereas, according to the second embodiment shown in FIG. 1(B), the recess 1b is formed roughly at a right angle to the inclined plane of the instrument panel 1. According to the first and second embodiments, the outer panel 4 is a member separated from the instrument panel 1; alternatively, the outer panel 4 may also be formed integrally with the instrument panel 1.

The outer panel 4 is mounted on the recess 1b so as to cover the opening 1a, and is fixed to the instrument panel 1 with the grips 4a. In this regard, the outer panel 4 has a substantially rectangular configuration similar to the opening 1a, as shown in FIG. 2(A). Further, the rectangular outer panel 4 has its length arranged so as to extend in a longitudinal direction generally orthogonal to the vehicle front-back direction so that its width is arranged to extend in a lateral direction that generally coincides with the vehicle front-back direction. Hence, a frame part 4b forming the circumference of the outer panel 4 is molded to align in shape with the recess 1b of the instrument panel 1. Specifically, according to the first embodiment shown in FIG. 1(A), the frame part 4b is substantially vertically directed, whereas, according to the second embodiment shown in FIG. 1(B), the frame part 4b is formed roughly at a right angle to the inclined plane of the instrument panel 1. The molding direction of the frame part 4b defines the releasing direction P of the die used for the injection molding of the outer panel 4. Thus, the die releasing direction P of the outer panel 4 according to the first embodiment is roughly vertical in the state of FIG. 1(A), whereas, the die releasing direction P of the outer panel 4 according to the second embodiment is roughly perpendicular to the inclined plane of the instrument panel 1 in the state of FIG. 1(B). On the surface of the outer panel 4 adjacent to the vehicle body, a plurality of notches 4c are formed for causing the outer panel 4 to easily break. With the notches 4c, the outer panel 4 is divided into a pair of fixed parts 4d and 4d and a pair of door parts 4e and 4e. The three notches 4c, 4c, and 4c shown in FIG. 1(A) or FIG. 1(B) may also be formed of a succession of linear groove.

On both sides of the surface of the outer panel 4 adjacent to the vehicle body, positioning ribs 41 are also raised at positions slightly spaced from the junction position of the inner case 5, respectively. The positioning rib 41 has a function to prevent the junction position of the inner case 5 from deviating in a direction roughly perpendicular to the vibrating direction during the vibration-welding the inner case 5 with the outer panel 4. The positioning rib 41 is directed in the same direction of the frame part 4b (i.e., the die releasing direction P of the outer panel 4) according to both the first and second embodiments respectively shown FIG. 1(A) and FIG. 1(B).

The inner case 5 is composed of an inner panel 5a to be vibration-welded on the surface of the outer panel 4 adjacent to the vehicle body and a side wall 5b forming a space for accommodating the retainer 3 therein. According to the first embodiment shown in FIG. 1(A), the side wall 5b is formed roughly at a right angle to the inner panel 5a (i.e., the inclined plane of the instrument panel 1). According to the second embodiment shown in FIG. 1(B), the side wall 5b is roughly vertically directed. The molding direction of the side wall 5b defines the releasing direction Q of the die used for the injection molding of the inner case 5. Thus, the die releasing direction Q of the inner case 5 according to the first embodiment is roughly perpendicular to the inclined plane of the instrument panel 1 in the state of FIG. 1(A), whereas, the die releasing direction Q of the inner case 5 according to the second embodiment is roughly vertical in the state of FIG. 1(B). As a result, the die releasing direction P of the outer panel 4 differs by an angle α from the releasing direction Q of the inner case 5 according to both the first and second embodiments. The side wall 5b is provided with a plurality of retainer holes 5c formed for retaining hooks 3a connected to the retainer 3.

The inner panel 5a is divided into two at the center, and each inner panel 5a is composed of a support part 5d to be welded to the fixed part 4d of the outer panel 4, a flap part 5e to be welded to the door part 4e, and a hinge part 5f formed between the support part 5d and the flap part 5e. The hinge part 5f is roughly U-shaped so as to be convex toward the vehicle body. The hinge part 5f has a function to gate-open the door part 4e of the outer panel 4 during the inflating of the airbag. A part of the periphery of each inner panel 5a, which is parallel with vibrating direction, is molded as a positioning plane 51 in a direction agreeing with the die releasing direction P of the outer panel 4. Namely, the positioning plane 51 according to the first embodiment shown in FIG. 1(A) is substantially vertically directed, whereas, according to the second embodiment shown in FIG. 1(B), the positioning plane 51 is formed roughly at a right angle to the inclined plane of the instrument panel 1. Although the positioning plane 51 is part of the inner case 5, which is a welding workpiece, the positioning plane 51 is molded in a direction agreeing with the die releasing direction P of the outer panel 4, which is a workpiece to be welded. Accordingly, the positioning plane 51 and the positioning rib 41 are arranged roughly in parallel with each other to stand face to face, and there is no useless clearance between them unlike in a conventional example, so that the inner case 5 cannot run on the positioning rib 41 when the inner case 5 is placed on the outer panel 4 and during the vibration welding, reducing the deviation injunction position.

Then, a vibration-welded structure according to the first embodiment will be described in detail with reference to FIG. 2. As shown in FIG. 2(A), the positioning ribs 41 raised from the outer panel 4 are arranged in the vicinities of four corners of the inner panel 5a along the positioning planes 51, respectively. The positioning rib 41 is also spaced from the positioning plane 51 by a predetermined clearance s. The clearance s is established so that the sum of both-side clearances s in a direction perpendicular to the vibrating direction is to be 0.5 mm or less. In the vicinities of four corners of a circumferential surface 52, perpendicular to the vibrating direction, of the inner panel 5a, positioning ribs 42 are raised along the circumferential surface 52 for preventing the junction position of the inner case 5 from deviating in the vibrating direction. The positioning rib 42 is spaced from the positioning plane 51 by a predetermined clearance t. The clearance t is larger than the clearance s so that the inner panel 5a does not come in contact with the positioning rib 42 during the vibration welding. For example, the clearance t is established so that the sum of both-side clearances t in the vibrating direction is 1.5 mm or less. The respective positioning ribs 41 and the positioning ribs 42 herein are arranged in the vicinities of the four corners of the inner panel 5a as shown in the drawing; however, each positioning rib 41 and each positioning rib 42 may be roughly arranged at the centers of the positioning plane 51 and the circumferential surface 52, respectively. Alternatively, they may also be arranged around the positioning plane 51 and the circumferential surface 52 at equal intervals, respectively, so that the arrangement and numbers thereof may be optionally established. Also, as shown in FIG. 2(B), the positioning plane 51 of the inner panel 5a is molded in a direction agreeing with the die releasing direction P of the outer panel 4.

Figure 3:
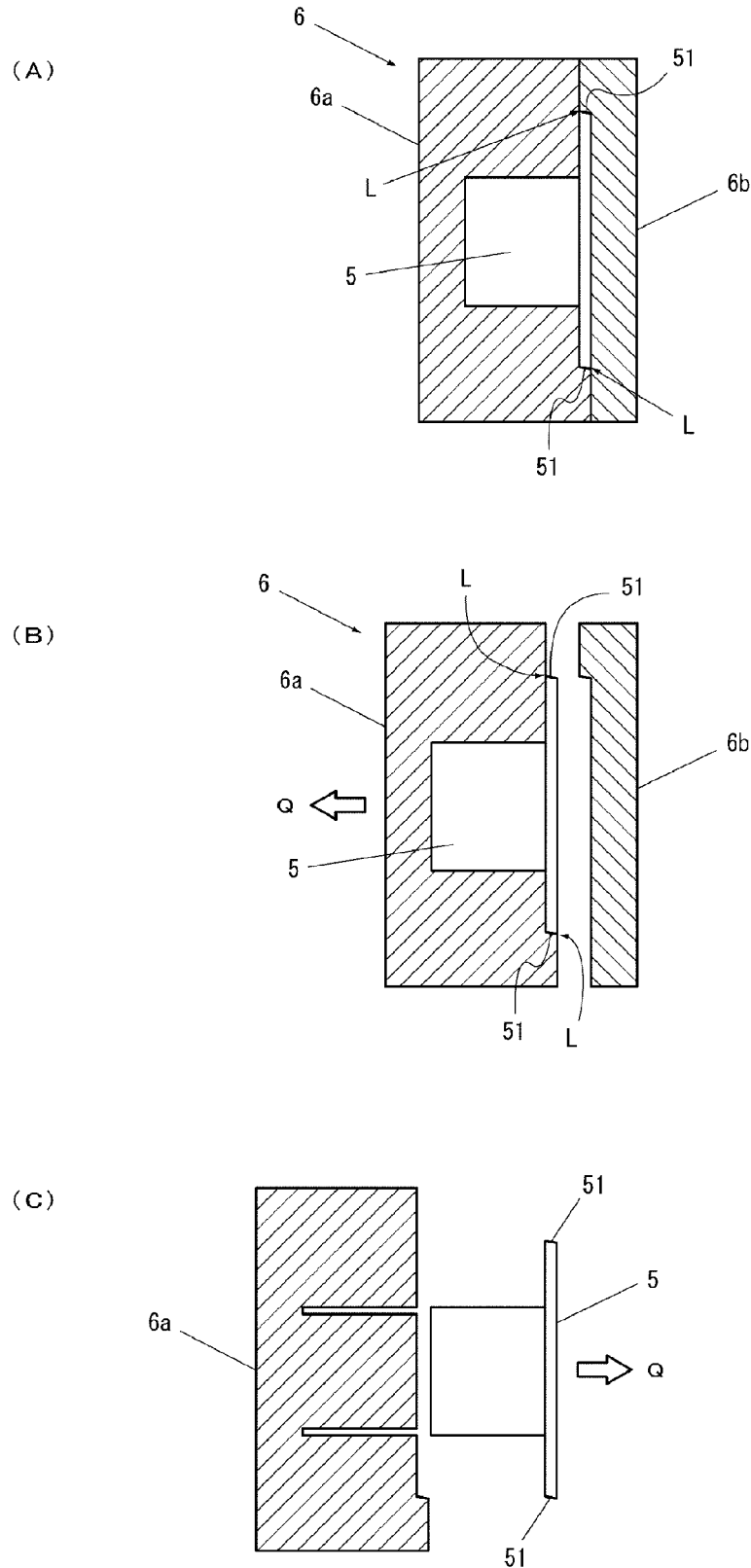
Figure 4:
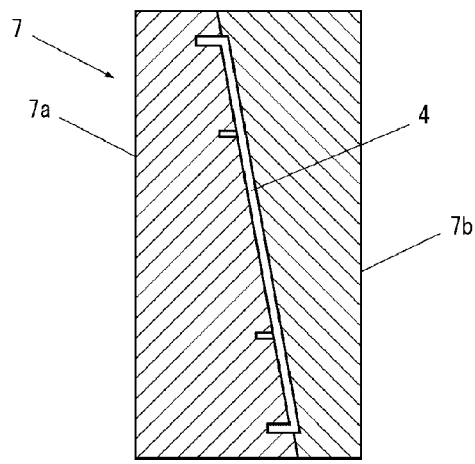
Figure 4:
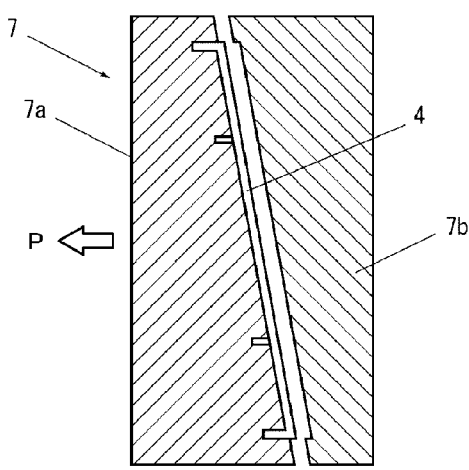
Figure 4:
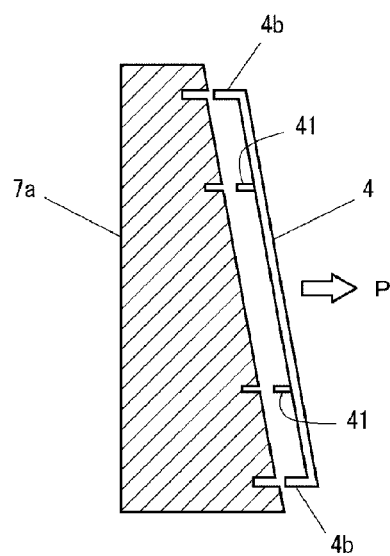
Figure 5:
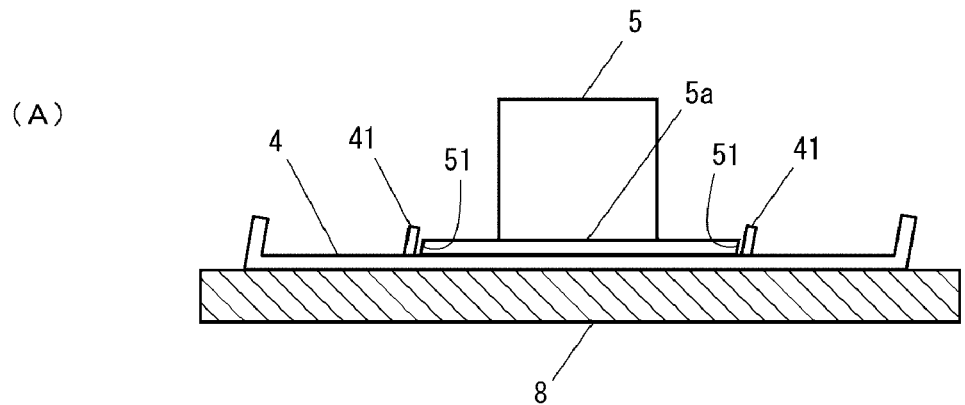
Figure 5:
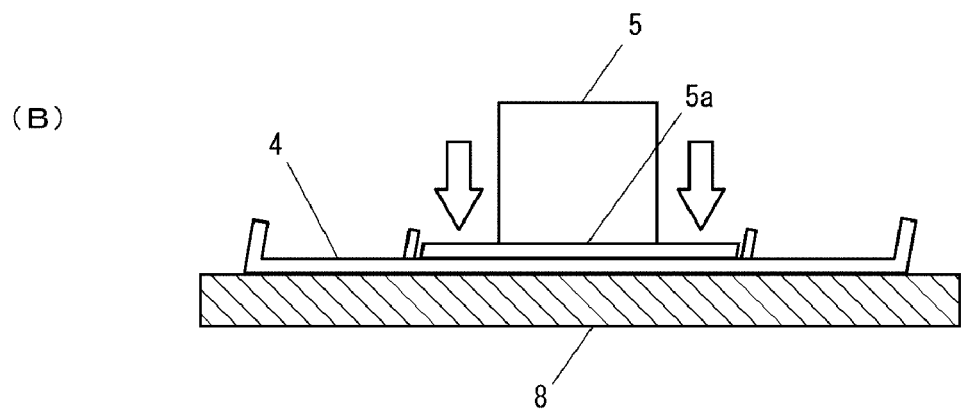
Figure 5:
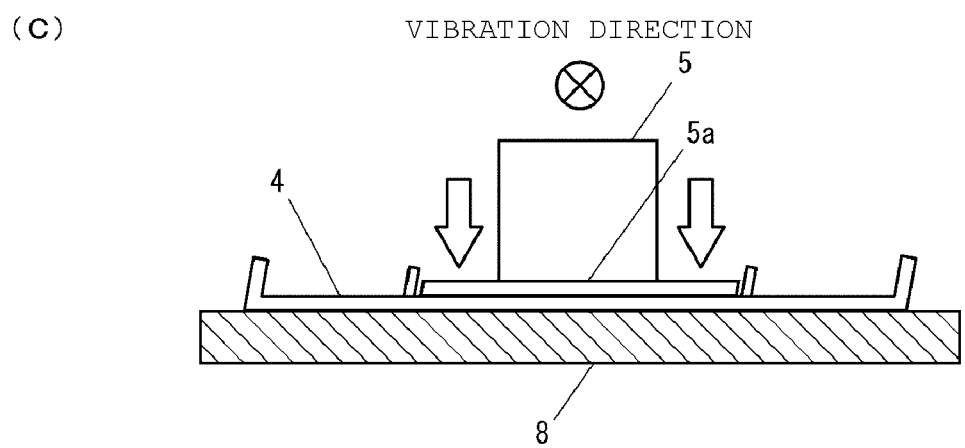

Then, a vibration welding method according to the present invention will be described with reference to FIGS. 3 to 5. FIG. 3 includes drawings showing an inner case fabricating process, in which FIG. 3(A) shows a product molding process; FIG. 3(B) a die releasing process; and FIG. 3(C) a product taking out process. FIG. 4 includes drawings showing an outer panel fabricating process, in which FIG. 4(A) shows a product molding process; FIG. 4(B) a die releasing process; and FIG. 4(C) a product taking out process. FIG. 5 includes drawings showing a vibration welding process, in which FIG. 5(A) shows a placing process; FIG. 5(B) a pressurizing process; and FIG. 5(C) a vibrating process.

A vibration welding method according to the present invention includes the steps of molding an inner case 5 so that a positioning plane 51 of the inner case 5 agrees with a die releasing direction P of an outer panel 4; molding the outer panel 4 so that a positioning rib 41 is molded at a position facing the positioning plane 51 of the outer panel 4; and vibration welding the inner case 5 by placing it on the outer panel 4 so that the positioning plane 51 faces the positioning rib 41.

The step of molding the inner case, as shown in FIG. 3, is a step of molding the inner case 5 using a die 6 composed of a male die 6a including a projection for impressing the inside of the inner case 5 and a female die 6b forming a cavity together with the male die 6a. First, as shown in FIG. 3(A), the movable-side male die 6a is approximated to the fixed-side female die 6b so as to bond them together. Then, a softened resin is injected into the cavity formed with the male die 6a and the female die 6b under a predetermined injection pressure, so that the resin filled in the die 6 is solidified so as to mold the inner case 5. At this time, the parting plane between the male die 6a and the female die 6b (parting line) is formed along the outermost edges L and L of the positioning planes 51 in a direction perpendicular to the vibrating direction during the vibration welding. Hence, one positioning plane 51 (the upper positioning plane 51 in FIG. 1(A)) of the positioning planes 51 on both sides of the inner case 5 is molded with the female die 6b while the other positioning plane 51 (the lower positioning plane 51 in FIG. 1(A)) is molded with the male die 6a.

Then, as shown in FIG. 3(B), the male die 6a is separated from the female die 6b in the releasing direction Q. At this time, the parting line of the die 6 is formed along the outermost edges L and L of the positioning planes 51, so that the male die 6a can be separated from the female die 6b without being disturbed by the positioning plane 51 of the inner case 5. Successively, as shown in FIG. 3(C), the inner case 5 is pushed out by a pin (not shown) in the releasing direction Q of the die 6 so that the product (the inner case 5) is taken out of the male die 6a. The parting line of the die 6 herein is also formed along the outermost edges L and L of the positioning planes 51, so that the male die 6a can be easily separated from the female die 6b without being disturbed by the positioning plane 51.

The step of molding the outer panel, as shown in FIG. 4, is a step of molding the outer panel 4 using a die 7 composed of a male die 7a including a projection for impressing the inside of the outer panel 4 and a female die 7b forming a cavity together with the male die 7a. First, as shown in FIG. 4(A), the movable-side male die 7a is approximated to the fixed-side female die 7b so as to bond them together. Then, a softened resin is injected into the cavity formed with the male die 7a and the female die 7b under a predetermined injection pressure, so that the resin filled in the die 7 is solidified so as to mold the outer panel 4. At this time, the parting plane between the male die 7a and the female die 7b (parting line) is formed to have the same angle as that of the inclined plane of the outer panel 4. Then, as shown in FIG. 4(B), the male die 7a is separated from the female die 7b in the releasing direction P. Successively, as shown in FIG. 4(C), the outer panel 4 is pushed out by a pin (not shown) in the releasing direction P of the die 7 so that the product (the outer panel 4) is taken out of the male die 7a. The frame part 4b and the positioning rib 41 of the outer panel 4 are molded in the same direction as the die releasing direction P, so that any specific devisal is not needed unlike the die 6 used for molding the inner case shown in FIG. 3.

The step of vibration welding, as shown in FIG. 5, is a step of the vibration welding the inner case 5 (the welding workpiece) to the outer panel 4 (the workpiece to be welded). First, as shown in FIG. 5(A), the outer panel 4 is placed on a pedestal 8 of a vibration welding machine so as to direct the inner surface (the surface adjacent to the vehicle body) of the outer panel 4 toward the front. Successively, the inner case 5 is placed on the outer panel 4 so as to direct the inner panel 5a of the inner case 5 toward the bottom. At this time, the inner case 5 is placed between the positioning ribs 41; since the positioning rib 41 is molded substantially in parallel with the positioning plane 51 of the inner panel 5a, the positioning can be done face to face. Hence, when the inner case 5 is placed on the outer panel 4, the inner case 5 cannot run on the outer panel 4 unlike in the conventional example, so that the positioning can be easily done. Thereby, the deviation in junction position of the inner case 5 can be reduced, resulting in the improvement of the product yield as well as enabling the operation without a skilled worker.

Then, as shown in FIG. 5(B), the inner panel 5a (the junction) is pressurized by pushing it onto the pedestal 8 from the above with the vibration welding machine. Successively, as shown in FIG. 5(C), while maintaining the pressurizing state, the inner case 5 is reciprocally vibrated in predetermined directions (herein the front-back directions of the plane of figure) by the vibration welding machine. When the inner case 5 has been reciprocally vibrated with a predetermined frequency for a predetermined time, a resin is melted due to the frictional heat so that the inner panel 5a is welded to the outer panel 4. The vibration welding conditions herein (frequency, time, and vibration amplitude) are widely different in accordance with the kinds of a resin and a product to be welded, so that they may be optionally established. Also, instead of the vibration welding machine, an ultrasonic welder, which is a kind of the vibration welding machine, may also be obviously used.

Figure 6:
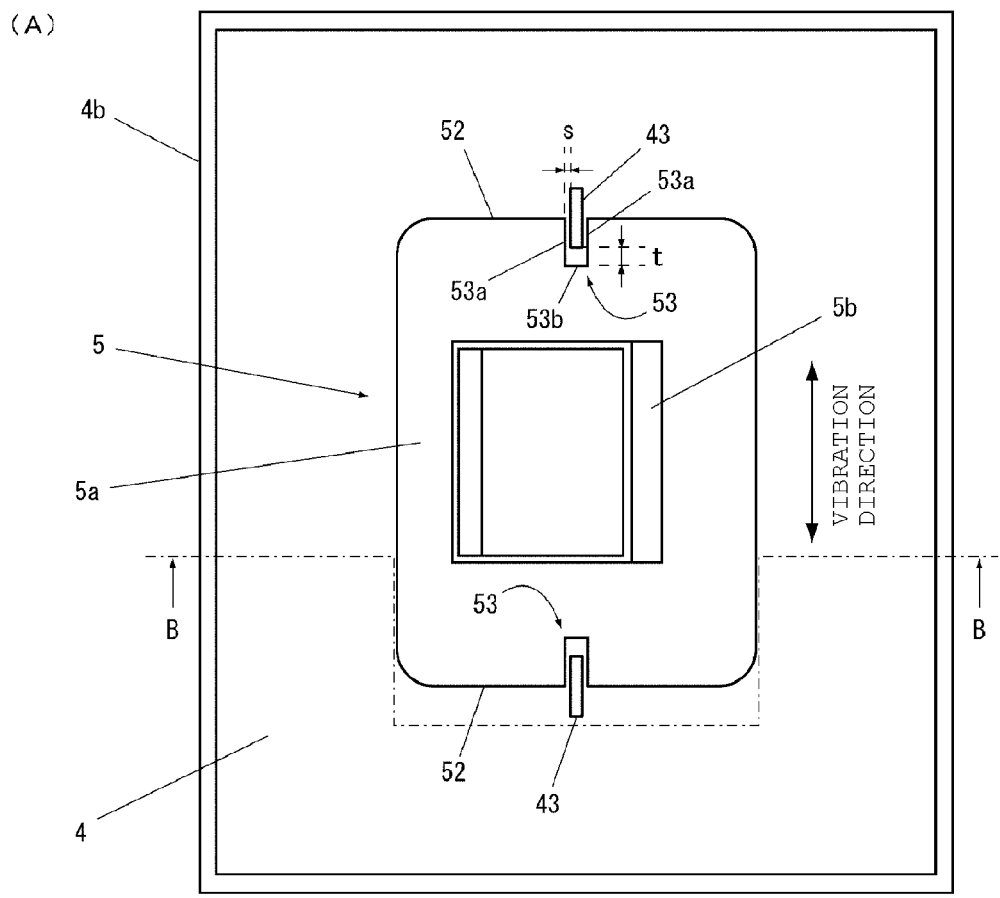
Figure 6:
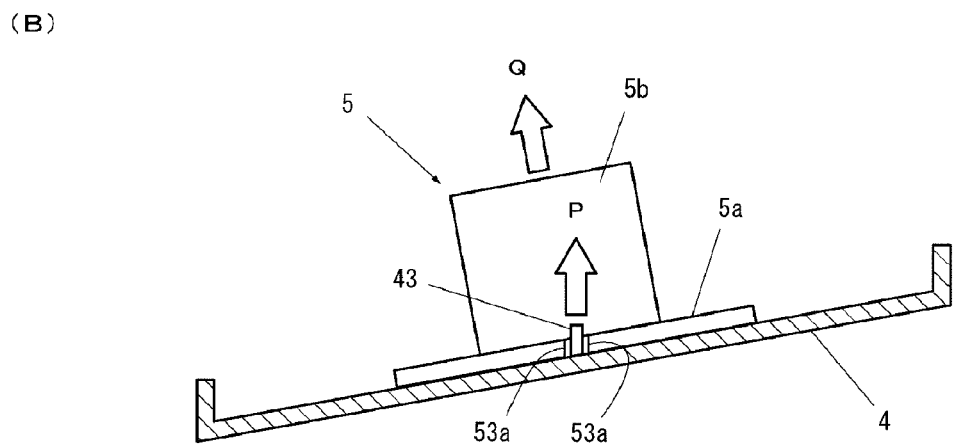
Figure 7:
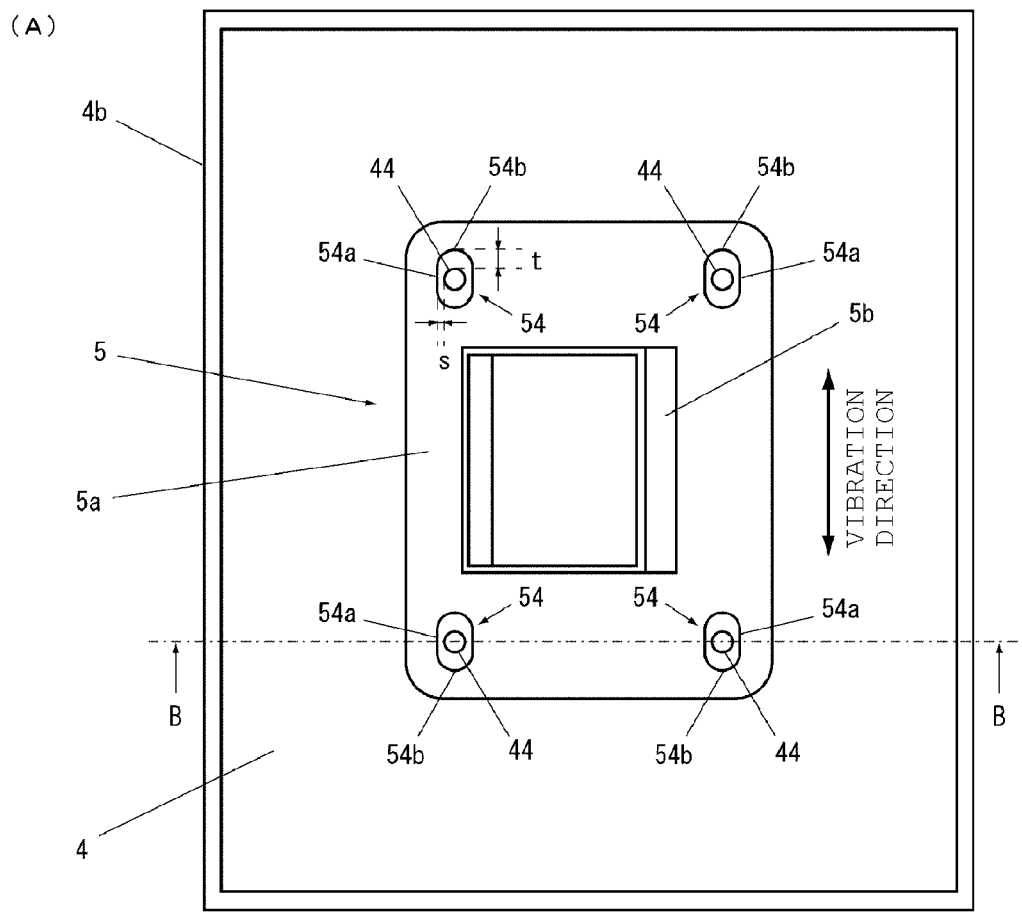
Figure 7:
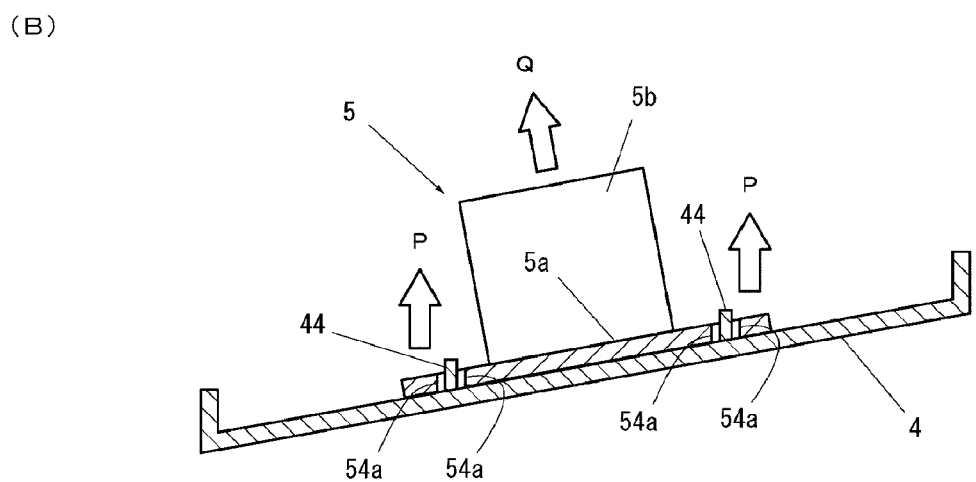
Figure 8:
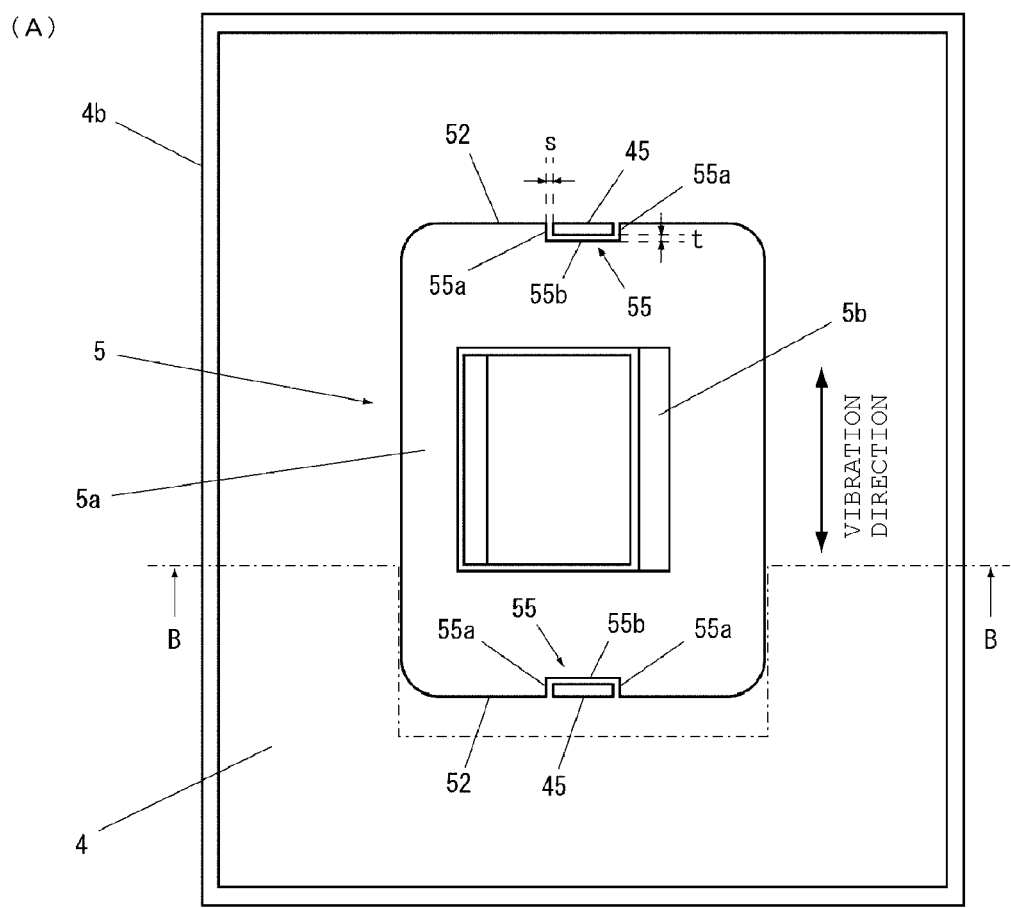
Figure 8:
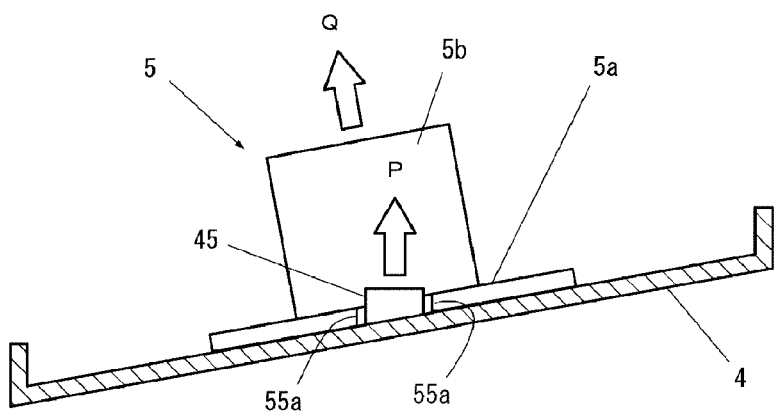
Figure 9:
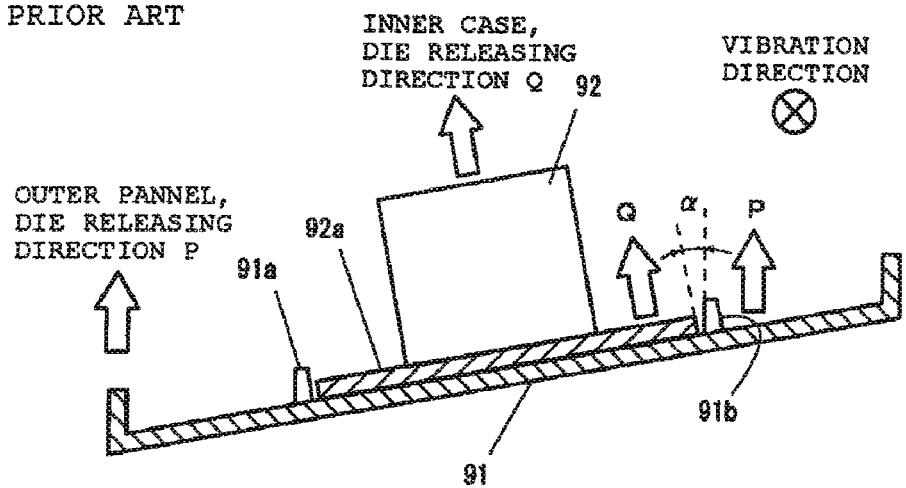
Figure 9:
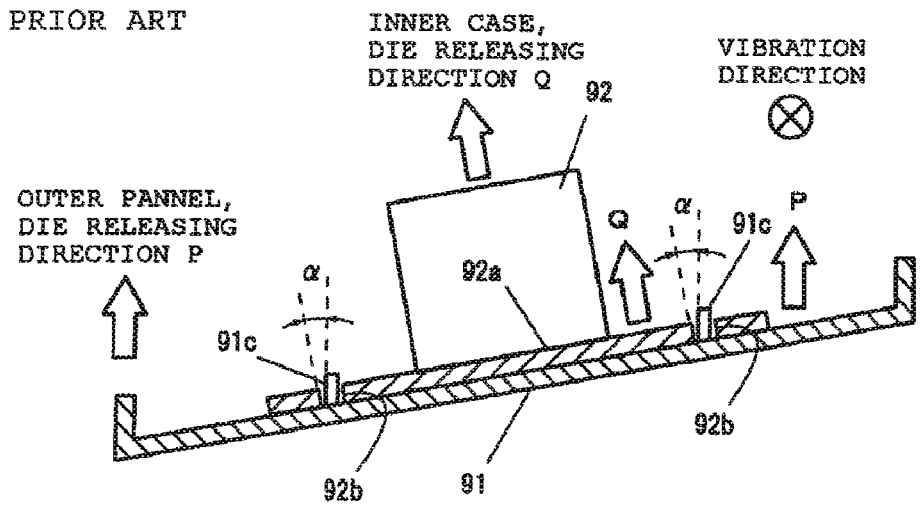
Figure 9:
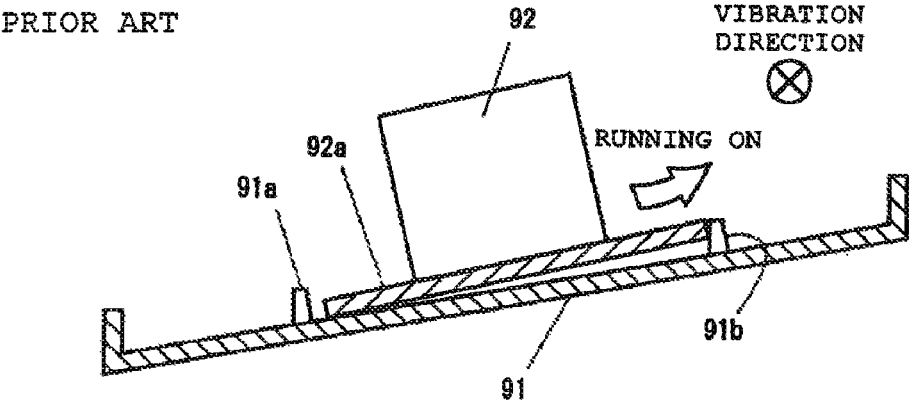

Next, other vibration welded structures of an airbag apparatus will be described with reference to FIGS. 6 to 8. FIG. 6 includes drawings showing a vibration welded structure according to a second embodiment, in which FIG. 6(A) is a plan view and FIG. 6(B) is a sectional drawing viewed in arrows B-B direction of FIG. 6(A). FIG. 7 includes drawings showing a vibration welded structure according to a third embodiment, in which FIG. 7(A) is a plan view and FIG. 7(B) is a sectional drawing viewed in arrows B-B direction of FIG. 7(A). FIG. 8 includes drawings showing a vibration welded structure according to a fourth embodiment, in which FIG. 8(A) is a plan view and FIG. 8(B) is a sectional drawing viewed in arrows B-B direction of FIG. 8(A).

In the vibration welded structure according to the second embodiment shown in FIG. 6, the inner panel 5a of the inner case 5 is provided with notches 53 formed on the circumferential surface 52 of the inner panel 5a, and the plane of the notch 53 roughly in parallel with the vibrating direction is to be a positioning plane 53a. The circumferential surface 52, as shown in FIG. 6(A), has both end-parts of the inner panel 5a roughly perpendicular to the vibration direction, and the notch 53 is formed at substantially the center of the end part. Each notch 53 is composed of a pair of the positioning planes 53a roughly in parallel with the vibration direction and positioning plane 53b roughly perpendicular to the vibration direction. The area of the positioning plane 53a is formed to be larger than that of the positioning plane 53b, so that the notch 53 is formed to have a longer length roughly in parallel with the vibration direction. The outer panel 4 is also provided with a pair of positioning ribs 43 extending in the vibration direction. The positioning rib 43 is formed at a position spaced from the positioning plane 53b by a predetermined clearance t. For preventing the inner panel 5a from coming in contact with the positioning rib 43 during the vibration welding, the clearance t is established so that the sum of both-side clearances t in the vibrating direction is 1.5 mm or less, for example. The positioning rib 43 is also formed at a position spaced from the positioning plane 53a by a predetermined clearance s. The clearance s is established so that the sum of both-side clearances s in a direction perpendicular to the vibration direction is 0.5 mm or less.

As shown in FIG. 6(B), the positioning plane 53a of the notch 53 is molded in a direction agreeing with the die releasing direction P of the outer panel 4. The positioning rib 43 is also molded in a direction agreeing with the die releasing direction P of the outer panel 4. Hence, the positioning plane 53a and the positioning rib 43 are arranged in parallel with each other and to face each other, and there is no useless clearance between them unlike in a conventional example, so that the inner case 5 cannot run on the positioning rib 43 when the inner case 5 is placed on the outer panel 4 and during the vibration welding, reducing the deviation injunction position. Also, with the positioning plane 53b of the notch 53 and the positioning rib 43, the inner case 5 can be positioned in the vibration direction, reducing the number of positioning ribs formed on the outer panel 4 so as to reduce cost. It may be obvious to form a plurality of notches on the circumferential surface 52 and the corresponding number of positioning ribs on the outer panel 4.

In the vibration welded structure according to the third embodiment shown in FIG. 7, the inner panel 5a of the inner case 5 is provided with openings 54 formed in the vicinities of four corners of the inner panel 5a, and the plane of the opening 54 roughly in parallel with the vibrating direction is to be a positioning plane 54a. Each opening 54 is composed of a pair of the positioning planes 54a roughly in parallel with the vibration direction and a positioning plane 54b roughly perpendicular to the vibration direction, so that the opening 54 is in a long-hole shape roughly in parallel with the vibration direction. The outer panel 4 is provided with positioning pins 44 formed at positions corresponding to the openings 54. The positioning pin 44 is arranged at a position spaced from the positioning plane 54b by a predetermined clearance t. For preventing the inner panel 5a from coming in contact with the positioning pin 44 during the vibration welding, the clearance t is established so that the sum of both-side clearances t in the vibrating direction is 1.5 mm or less, for example. The positioning pin 44 is also arranged at a position spaced from the positioning plane 54a by a predetermined clearance s. The clearance s is established so that the sum of both-side clearances s in a direction perpendicular to the vibration direction is 0.5 mm or less.

As shown in FIG. 7(B), the positioning plane 54a of the opening 54 is molded in a direction agreeing with the die releasing direction P of the outer panel 4. The positioning pin 44 is also molded in a direction agreeing with the die releasing direction P of the outer panel 4. Hence, the positioning plane 54a and the positioning pin 44 are arranged substantially in parallel with each other so as to face each other. Thus, there is no useless clearance between them unlike in a conventional example, so that the inner case 5 cannot run on the positioning pin 44 when the inner case 5 is placed on the outer panel 4 and during the vibration welding, reducing the deviation injunction position. With the positioning plane 54b of the opening 54 and the positioning pin 44, the positioning of the inner case 5 can also be done in the vibration direction, reducing the number of positioning ribs formed on the outer panel 4 so as to reduce cost. In addition, the opening 54 and the positioning pin 44 may also be arranged roughly at the centers of the circumferential surfaces 52 on both ends substantially perpendicular to the vibration direction, respectively. In this case, only two openings 54 and two positioning pins 44 may be provided so as to further reduce cost.

In the vibration welded structure according to the fourth embodiment shown in FIG. 8, the inner panel 5a of the inner case 5 is provided with notches 55 formed on the circumferential surface 52, and the plane of the notch 55 roughly in parallel with the vibrating direction is to be a positioning plane 55a. The circumferential surface 52, as shown in FIG. 8(A), constitutes both-end parts roughly perpendicular to the vibration direction of the inner panel 5a, and the notch 55 is formed substantially at the center of each of the both-end parts. Each notch 55 is composed of a pair of the positioning planes 55a roughly in parallel with the vibration direction and a positioning plane 55b roughly perpendicular to the vibration direction. The area of the positioning plane 55a is formed to be smaller than that of the positioning plane 55b, so that the notch 55 is formed to have a longer length roughly perpendicular to the vibration direction. The outer panel 4 is provided with a pair of positioning ribs 45 extending in a direction roughly perpendicular to the vibration direction. The positioning rib 45 is formed at a position spaced from the positioning plane 55b by a predetermined clearance t, while being formed at a position spaced from the positioning plane 55a by a predetermined clearance s. The clearance s and the clearance t are established so that the sum of both-side clearances is 0.5 mm or less, for example.

As shown in FIG. 8(B), the positioning plane 55a of the notch 55 is molded in a direction agreeing with the die releasing direction P of the outer panel 4. The positioning rib 45 is also molded in a direction agreeing with the die releasing direction P of the outer panel 4. Hence, the positioning plane 55a and the positioning rib 45 are arranged substantially in parallel with each other so as to face each other. Thus, there is no useless clearance between them unlike in a conventional example, so that the inner case 5 cannot run on the positioning rib 45 when the inner case 5 is placed on the outer panel 4 and during the vibration welding, reducing the deviation injunction position. With the positioning plane 55b of the notch 55 and the positioning rib 45, the positioning of the inner case 5 can also be done in the vibration direction, reducing the number of positioning ribs formed on the outer panel 4 so as to reduce cost. According to the fourth embodiment, the direction of the positioning rib 43 according to the second embodiment is changed by 90°. When the positioning rib 45 is molded in such a manner, the positioning rib 45 can be distorted in the vibration direction, so that the clearance t can be set smaller than that of the second embodiment. Hence, the positioning of the inner case 5 can be more precisely done, further reducing the deviation injunction position of the inner case 5.

According to the embodiments described above, the passenger airbag apparatus has been exemplified as the airbag apparatus; however, the present invention is not limited to the passenger airbag apparatus, so that an airbag apparatus provided in any part may be incorporated as long as the airbag apparatus includes an airbag that is normally folded and is inflated and developed at an emergency; an inflator for supplying gas to the airbag; a retainer for accommodating at least the airbag therein; an outer panel for covering an opening formed on a vehicle structure for releasing the airbag therethrough; and an inner case connected to the inside of the outer panel for retaining the retainer, in which die releasing directions of the outer panel and the inner case during molding differ from each other, and the outer panel and the inner case are joined together by vibration welding.

As the vibration welded structure, the airbag apparatus has be exemplified; however, the present invention is not limited to the vibration welded structure of the airbag apparatus, so that the vibration welded structure of any product or any component may be incorporated to the present invention as long as the vibration welded structure is configured of workpieces welded together by applying vibration to the junction between the pressurized workpieces, of which die releasing directions differing from each other, in a predetermined direction. For example, in the automobile industries, the resin molded products have been used for engine components, airbag apparatus components, interior and exterior components (an instrument panel, a duct, a door trim, a grove box, a center console, and a bumper), so that when the vibration welding is used for welding these components and when the die releasing direction of the welding workpiece is different from that of the workpiece to be welded, the vibration welding method according to the present invention may be incorporated, obtaining the vibration welded structure according to the present invention.

The present invention is not limited to the embodiments described above, so that various modifications can be obviously made within the scope of the present invention.

What is claimed is:

1. An airbag apparatus comprising:

an airbag;

an instrument panel including a cover panel portion overlying the airbag and having a first welding surface thereon with the first welding surface having a planar configuration;

a first pair of positioning surfaces extending parallel to each other in a first direction either normal or oblique to the first welding surface;

an inner case including a door panel portion having a second welding surface thereon with the second welding surface having a planar configuration that extends across the entire extent of the inner case door panel portion so that the second welding surface is configured to bear flush against the first welding surface across the entire extent of the door panel portion;

a depending wall of the inner case that extends in a second direction transverse to the first direction;

a hinge portion of the inner case that interconnects the door panel portion to the depending wall; and at least a second pair of positioning surfaces of the door panel portion extending parallel to each other in the first direction for cooperating with the first pair of positioning surfaces to keep the first and second welding surfaces bearing flush against each other during vibration welding thereof, the first and second pair of positioning surfaces being arranged so that with the inner case centered relative to the cover panel portion, adjacent ones of the positioning surfaces of the first pair and the second pair of positioning surfaces have a predetermined clearance spacing therebetween.

2. The airbag apparatus of claim 1, wherein the first pair of positioning surfaces are flat and extend parallel to each other, and the second pair of positioning surfaces are flat and extend parallel to each other and to the flat and parallel, first pair of positioning surfaces in close confronting relation thereto with the first and second welding surfaces bearing flush against each other.

3. The airbag apparatus of claim 1, wherein the cover panel portion includes a pair of ribs, the first pair of positioning surfaces comprise opposite, inwardly facing, flat and parallel surfaces of ribs, and the second pair of position surfaces comprise opposite outer, flat and parallel side edge surfaces of the door panel portion for being oriented in close confronting and parallel relation with the parallel and flat, inwardly facing surfaces of the ribs.

4. The airbag apparatus of claim 1, wherein the cover panel portion includes a pair of pins, the first pair of positioning surfaces comprise annular surfaces of the pins, the door panel portion includes a pair of through openings sized to receive the pins therein, and the at least a second pair of positioning surfaces comprises second opposite, inwardly facing surfaces on either side of each of the through openings so that there are two second pairs of positioning surfaces.

5. An airbag apparatus comprising:
an airbag;
an instrument panel including a cover panel portion overlying the airbag and having a first welding surface thereon;
a first pair of positioning surfaces extending parallel to each other in a first direction either normal or oblique to the first welding surface;
an inner case including a door panel portion having a second welding surface thereon configured to bear flush against the first welding surface;
a depending wall of the inner case that extends in a second direction transverse to the first direction; and
at least a second pair of positioning surfaces of the door panel portion extending parallel to each other in the first direction for cooperating with the first pair of positioning surfaces to keep the first and second welding surfaces bearing flush against each other during vibration welding thereof, wherein the cover panel portion includes at least one rib, the first pair of positioning surfaces comprise opposite, outwardly facing, parallel and flat surfaces of the rib, the door panel portion includes at least one notch sized to fit the rib therein, and the second pair of positioning surfaces comprise opposite, inwardly facing, parallel and flat surfaces of the notch.

6. The airbag apparatus of claim 5, wherein the at least one rib and at least one notch comprises a pair of identical ribs and notches that are spaced longitudinally and centered widthwise along the cover and door panel portions.

7. The airbag apparatus of claim 6, wherein the ribs and notches are oriented to extend lengthwise in a longitudinal direction along the cover and door panel portions and in which the welding surfaces of the panel portions are to be vibration welded together.

8. The airbag apparatus of claim 6, wherein the ribs and notches are oriented to extend lengthwise in a lateral direction orthogonal to a longitudinal direction along the cover and door panel portions and in which the welding surfaces of the panel portions are to be vibration welded together.

* * * * *